United States Patent
Potts (10) Patent No.: US 7,465,390 B2
(45) Date of Patent: Dec. 16, 2008

(54) LOW ASPECT RATIO WASTEWATER SYSTEM

(76) Inventor: David A. Potts, 385 Roast Meat Hill Rd., Killingworth, CT (US) 06419

( * ) Notice: Subject to any disclaimer, the term of this patent is extended or adjusted under 35 U.S.C. 154(b) by 0 days.

(21) Appl. No.: 11/144,968

(22) Filed: Jun. 3, 2005

(65) Prior Publication Data

US 2005/0269253 A1 Dec. 8, 2005

Related U.S. Application Data

(60) Provisional application No. 60/576,950, filed on Jun. 4, 2004.

(51) Int. Cl.
*C02F 3/02* (2006.01)

(52) U.S. Cl. .............. 210/151; 210/170.08; 210/532.2; 405/45; 405/50

(58) Field of Classification Search .............. 210/170, 210/150, 151, 532.2, 170.08; 405/43, 45, 405/50, 36
See application file for complete search history.

(56) References Cited

U.S. PATENT DOCUMENTS

| | | | |
|---|---|---|---|
| 2,397,655 A | | 4/1946 | Francis |
| 2,795,542 A | * | 6/1957 | Horne et al. ............... 210/170 |
| 2,802,339 A | * | 8/1957 | Fogerty ..................... 210/170 |
| 3,698,194 A | * | 10/1972 | Flynn ....................... 210/532.2 |
| 4,039,451 A | * | 8/1977 | Smith ....................... 210/170 |
| 4,065,925 A | | 1/1978 | Auriemma |
| 4,102,135 A | | 7/1978 | Auriemma |
| 4,183,696 A | | 1/1980 | Auriemma |
| 4,246,305 A | | 1/1981 | Delattre |
| 4,313,692 A | | 2/1982 | Johnson |
| 4,639,165 A | * | 1/1987 | Flecknoe-Brown ......... 210/170 |
| 4,662,778 A | | 5/1987 | Dempsey |
| 4,904,112 A | * | 2/1990 | McDonald ................. 405/45 |
| 4,904,113 A | | 2/1990 | Goddard et al. |
| 4,948,295 A | * | 8/1990 | Pramsoler ................. 405/36 |
| 5,017,042 A | | 5/1991 | Minor |
| 5,100,258 A | * | 3/1992 | VanWagoner .............. 405/45 |
| 5,129,758 A | * | 7/1992 | Lindstrom ................. 405/43 |
| 5,382,363 A | * | 1/1995 | Boylen ..................... 210/532.2 |
| 5,639,364 A | | 6/1997 | Houck |
| 5,752,784 A | | 5/1998 | Motz |
| 5,887,625 A | | 3/1999 | Takahashi |
| 5,921,711 A | * | 7/1999 | Sipaila ..................... 405/45 |
| 5,951,203 A | | 9/1999 | Laak |
| 6,428,239 B1 | * | 8/2002 | Davis ....................... 210/170 |
| 6,464,865 B2 | * | 10/2002 | Tipton et al. .............. 210/532.2 |
| 6,485,647 B1 | * | 11/2002 | Potts ........................ 210/150 |

(Continued)

*Primary Examiner*—Christopher Upton
(74) *Attorney, Agent, or Firm*—Pillsbury Winthrop Shaw Pittman LLP (57) ABSTRACT

A leaching conduit comprising: a low aspect ratio channel; a pipe in fluid communication with the low aspect ratio channel; wherein the aspect ratio of the low aspect channel is configured to promote aerobic conditions in and around the leaching conduit. A wastewater system comprising: a processing tank; a leaching conduit in fluid communication with a dosing device; wherein the leaching conduit comprises: a low aspect ratio channel; a dosing pipe in fluid communication with the low aspect ratio channel; and wherein the aspect ratio of the low aspect channel is configured to promote aerobic conditions in and around the leaching conduit. A dosing pipe comprising: a perforated tube; and a slotted sleeve located over the perforated tube. A slotted sleeve configured to fit over a perforated tube.

37 Claims, 5 Drawing Sheets

U.S. PATENT DOCUMENTS

| | | |
|---|---|---|
| 6,531,063 B1 | 3/2003 | Rose |
| 6,540,910 B2 * | 4/2003 | Schwarzenegger et al. .. 210/151 |
| 6,821,424 B1 * | 11/2004 | Branz ........................ 210/151 |
| 6,869,533 B2 * | 3/2005 | Norgaard .................... 210/170 |
| 2002/0044833 A1 | 4/2002 | Kruger |
| 2004/0022583 A1 * | 2/2004 | Bussey et al. ................. 405/43 |

* cited by examiner

Fig. 12

# LOW ASPECT RATIO WASTEWATER SYSTEM

CROSS-REFERENCES

The present application claims the benefit of provisional patent application No. 60/576,950 filed on Jun. 4, 2004 by David A. Potts.

TECHNICAL FIELD

The present invention relates leach fields and aerobic treatment of wastewater within soil, and more particularly to a low aspect ratio wastewater system and leaching conduit.

BACKGROUND

Familiar leaching conduits, such as arch shape cross section molded plastic chambers, or stone filled trenches with perforated pipe, used for domestic and commercial wastewater systems provide interior void space, based on the thinking that a buffer space or flow equalization is thus provided for variations of inflow of wastewater. The sidewalls of conduits, where they interface with the surrounding soil, are also commonly conceived as providing surface area for percolation of wastewater, in addition to the bottom surface of the conduit. A familiar crushed stone filled trench, having a modest (4 inch) diameter perforated pipe running along its length may have about 50% void space. Currently, arch shape cross-section molded plastic leaching chambers have entirely open interiors, open bottoms and sloped and perforated sidewalls. A common cross section shape for each typical conduit has a width of about 30 to 36 inches and a height of about 12 to 18 inches. Thus this conduit may have from about 12 inches to about 18 inches of water depth at any one time. Although in reality flow goes through the sides and bottom, this patent application will assume a mostly downward flow through the bottom surface of the conduit, then the ratio of volume of water to surface area that the water will flow through is nominally in the range 12 to 1, up to 16 to 1. It has been seen that in these prior art conduits, a biomat will often form on the bottom and sides of the conduit, thereby lessening the effectiveness of the leaching conduits to properly infiltrate the wastewater into the soil. Drip irrigation lines are usually approximately one half inch in diameter and are typically buried 12 to 6 inches below grade.

Leaching conduits are typically covered with 6 to 12 inches or more of soil, for several reasons. One is to protect the conduits from damage. Another is to prevent contact of humans and animals with potentially deleterious microorganisms associated with the wastewater being treated. Still another is to prevent odors. The dimensions of the conduits discussed in the preceding paragraph would lead to the fact that the bottom surface of the conduits are typically at about 24 inches or more below the soil surface.

Generally, it is an aim to have aerobic treatment of the wastewater in the soil. Current thinking with prior art systems is that there is an air-soil gas interchange, so that oxygen is continuously supplied to the soil, to enable good microbiological treatment. However, the soil depths at which prior art conduits operate are disadvantaged in this respect. Since the bottom surface of the conduits are typically about 18 to 24 inches below the soil surface. Thus the bottom surfaces of the conduits are often in an anaerobic condition since the oxygen demand exceeds the oxygen supply. One improvement with such systems is to force air serially through the conduit and soil influence zone which surrounds the conduit, as described in U.S. Pat. No. 6,485,647 to David Potts, issued on Nov. 26, 2002, and which is incorporated by reference in its entirety.

Therefore, a wastewater system is needed that provides for greater aerobic conditions in leaching conduits, thereby allowing for greater processing of the wastewater prior and during absorption into the soil.

SUMMARY

The disclosed apparatus relates to a leaching conduit comprising: a low aspect ratio channel; a pipe in fluid communication with the low aspect ratio channel; wherein the aspect ratio of the low aspect channel is configured to promote aerobic conditions in and around the leaching conduit.

The disclosed system relates to a wastewater system comprising: a processing tank; a leaching conduit in fluid communication with a dosing device; wherein the leaching conduit comprises: a low aspect ratio channel; a dosing pipe in fluid communication with the low aspect ratio channel; and wherein the aspect ratio of the low aspect channel is configured to promote aerobic conditions in and around the leaching conduit.

The disclosed apparatus also relates to a dosing pipe comprising: a perforated tube; and a slotted sleeve located over the perforated tube.

The disclosed apparatus, in addition, relates to a slotted sleeve configured to fit over a perforated tube.

BRIEF DESCRIPTION OF THE DRAWINGS

The present disclosure will be better understood by those skilled in the pertinent art by referencing the accompanying drawings, where like elements are numbered alike in the several figures, in which.

DETAILED DESCRIPTION

In the present invention, as illustrated by the FIGS. 1 through 11, conduit 20 has a much lower aspect ratio (height divided by width) than conduits in the prior art. Thus, the bottom of the conduit can be positioned closer to the surface of the soil. And, it is an option to install a leaching system by laying a multiplicity of conduits 20 on the soil grade and to then cover them with appropriately chosen media and/or soil. This approach is especially advantageous for leaching system sites having shallow depths of native soil, such as those which overlie a high water table or ledge, and the like. The disclosed conduits may be installed in spaced apart rows, or in segments which are spaced apart, all interconnected by suitable distribution lines. In the following, one conduit segment or length is described.

Figure 1:
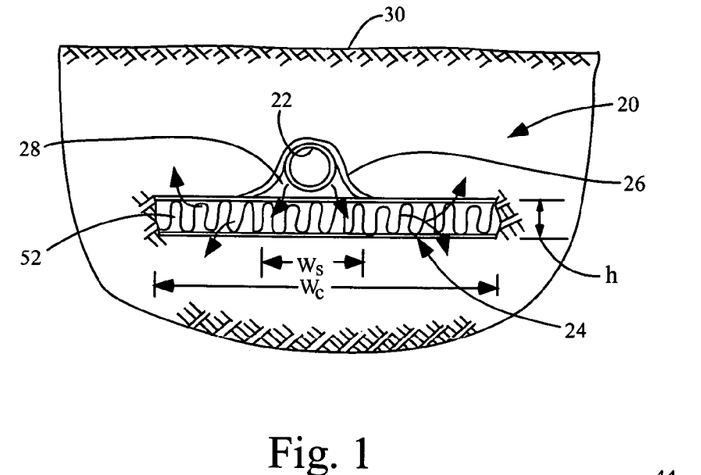
FIG. 1 is a cross-sectional view of a disclosed low aspect ratio leaching conduit.

In one embodiment, shown in FIG. 1, the disclosed conduit 20 comprises a perforated dosing pipe 22 which overlies a low aspect channel 24 all of which lie beneath a soil surface 30. The low aspect channel 24 is approximately rectangular shaped in this cross-sectional view. The pipe 22 distributes the wastewater relatively evenly along the length of the channel 24. A dosing pipe will typically be of a small diameter, for instance from about ¾ to about 2 inch in diameter. The pipe has suitable small spaced apart openings along its length, which openings may be smaller near its water source and larger farther away. A geotextile shroud 26 drapes over the pipe 22, so it runs downwardly and laterally outward, onto the top surface of low aspect channel 24. The shroud extends to the outer edges of the channel 24, to keep soil from infiltrating vertically down into the voids of the channel 24. The shroud provides assurance that there will be good water flow path from the pipe perforations and underside of the pipe, to the top of the channel 24. Optionally, some crushed stone, or plastic pieces or other granular or permeable media, may be placed in the space 28 under the shroud 26, near the pipe 22. With reference to FIG. 1, in one embodiment, the top of the low aspect channel 24 may be considered essentially planar, because as shown in the end view of FIG. 1, the shroud width "wS", that is the width of the base of the vaguely triangular cross section which comprises the region defined by the sloping surfaces of the shroud 26 is a small fraction of the channel width "wC". Alternatively, the shroud 26 may be a preformed shape permeable material, such as perforated molded plastic. In another variation, the shroud may be impermeable when used with blower systems and since the preponderance of the top of the channel 24 will be permeable. If a blower is in fluid communication with the low aspect ratio channel, the blower may be configured to intermittently blow air and/or some other gas through the channel 24 in order to assist in drying out the adjacent soil and to prevent biological buildup. Additionally, the blower may be configured to provide oxygen to the conduit and assist in dissipating water into the soil. The blower may also be configured to keep the dosing pipe and perforations from clogging with organic matter. The blower may dissipate water from the soil such that it prevents freezing around the conduit.

Figure 2:
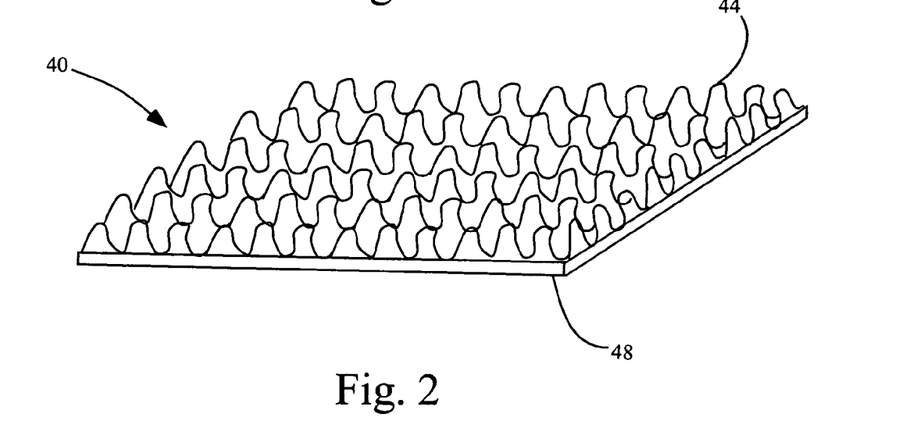
FIG. 2 is a perspective view of a geonet.
Figure 3:
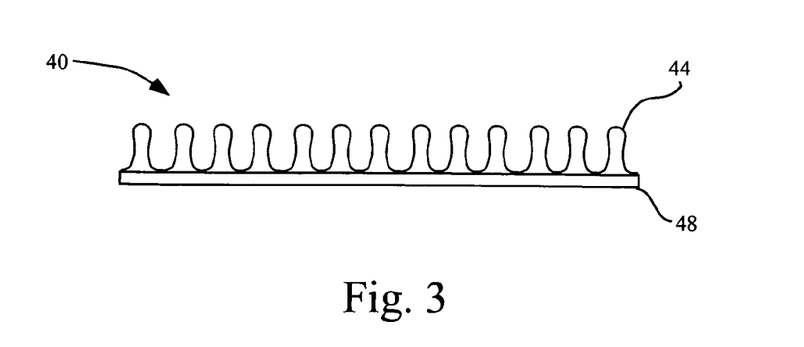
FIG. 3 a front view of the geonet from FIG. 2.
Figure 4:
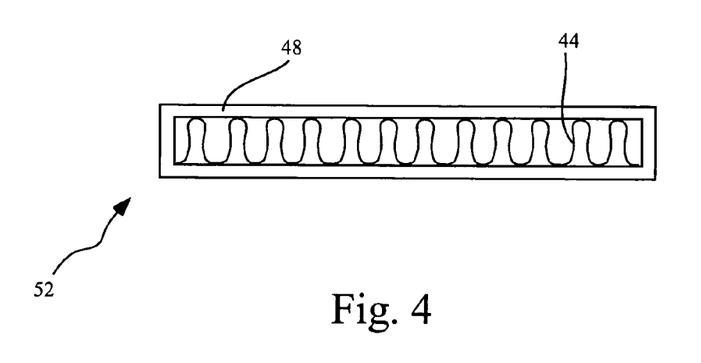
FIG. 4 is a front view of another embodiment of the disclosed geonet.

The low aspect channel may have a geonet 40 located within it. The geonet 40 may be obtained from various manufacturers, such as, but not limited to: Enkadrain drainage system product No. 9120 from Colbond Inc., P.O. Box 1057, Enka, N.C. 28728; and the several geonets named Grasspave2, Gravelpave2, Rainstore2, Slopetame2, Draincore2, Surefoot4, Rainstore3 from Invisible Structures, Inc., 1600 Jackson Street, Suite 310, Golden, Colo. 80401, and Advanedge® flat pipe from Advanced Drainage Systems, Inc. 4640 Trueman Boulevard, Hilliard, Ohio 43026. Referring now to FIG. 2, a perspective view of a geonet 40 is shown. The geonet 40 is typically comprised of an irregularly coiled stringy structure 44 contained between one or two layers of air-permeable sheeting 48, which layers may feel to the touch like thin felt, and which is commonly and generically called geotextile. In one embodiment, the geonet 40 has only one layer and one side of the layer has the irregularly coiled string plastic structure, as shown in FIG. 2 and FIG. 3 which is a side view of the geonet 40. The low aspect channel 24, comprising the geonet 40, may have an estimated void volume of about 90%.

In one embodiment, the low aspect channel 24 will have a thickness, or height "h" as shown in FIG. 1, of about ¾ inch. The channel width "$w_c$", or lateral dimension of the channel 24 may be about 12 to about 48 inches, and preferably about 12 to about 40 inches. Optionally, geotextile may be placed at the opposing side of the vertical edges of the channel 24, to stop potential ingress of soil. In use, wastewater introduced into the low aspect channel 24 will percolate into the soil in the downward direction primarily, to a lesser extent in the sideways directions owing to the small vertical edge dimension, and also in the upward direction, when the conduit is full. Since the top of the conduit is permeable to air, there is good microbiological functioning of the leaching system, since air from the soil between the channel 24 and the surface can diffuse into the channel 24. If a geonet is used which has both a top and a bottom layer of air-permeable sheeting 48, such as the geonet 52 shown in FIG. 4, the local portion of the top layer in vicinity of the pipe 22 may be removed, and the shroud 26 need only extend laterally a small distance from the pipe 22.

Figure 5:
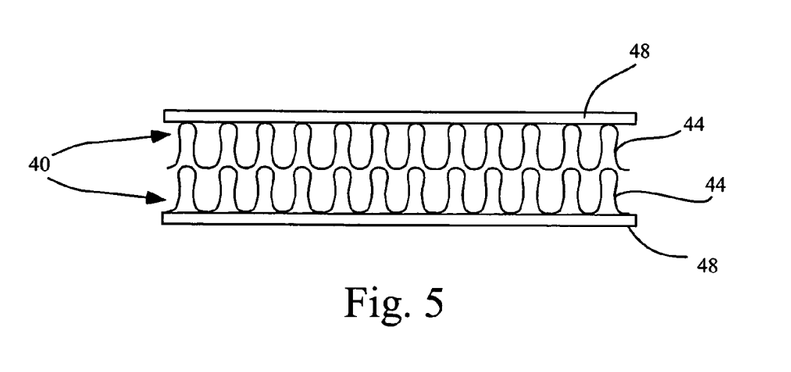
FIG. 5 is a front view of another embodiment of the disclosed geonet.

In alternate embodiments, the low aspect channel may be deeper than a preferred geonet material. In that case, one or more geonet mats may be laid on top of the other, such as shown in FIG. 5, where two geonet mats 40 are laid on top of one another, with the irregularly coiled stringy plastic structure 44 facing each other. In another embodiment, the geonet mats may be fabricated with a greater thickness, e.g., about 2 inches, about 3 inches or about 6 inches in thickness. In embodiments with thicker geonet mats, it may be practical to omit the dosing pipe and allow the wastewater to flow through the void space of the mat, from a low aspect channel end or selected injection points.

The aspect ratio of the low aspect channel 24 may be less than about 6/30 (6 units of height divided by 30 units of width, or about 0.2), preferably the aspect ratio will less than about 1/10 (1 unit of height divided by 10 unites of width, or about 0.1), and more preferably the aspect ratio will about 1/30 (1 unit of height divided by 30 unites of width, or about 0.033) to about 1/36 (1 unit of height divided by 36 unites of width, or about 0.028) or less. These ratios reflect only the dimensions of the channel 24, and not the dosing pipe 22. However, inasmuch as the preferred dosing pipe 22 is small in diameter and vertical dimension, the ratios are roughly applicable to the whole of the conduit as well.

In other embodiments, the low aspect channel 24 may be much wider than shown; and, it may comprise a continuous wide layer beneath the soil surface 30. Spaced channels 24 (also called laterals or branches), following the traditional leach field layout may be utilized in another embodiment.

In one embodiment, the perforated pipe 22 will be about 4 to 12 inches beneath the surface of the soil 30. Thus, in that embodiment, the bottom of the low aspect channel 24 will be about 5-17 inches deep, depending on the diameter of pipe 22 (if a pipe 22 is used in the embodiment). Thus, it is feasible in many soil areas to have the conduit wholly in the generally more permeable A-horizon of the soil. Since most wastewater will percolate downwardly into the soil beneath the low aspect channel 24, the wastewater will be better treated than if the bottom of the conduit was deeper. The soil nearer the surface has better chance of being maintained or restored to aerobic condition by natural diffusion processes within the soil. In another embodiment, there will only be one perforation in the pipe 22 about every 10 to 20 feet.

In another embodiment, pipe 22 may be inside the confines of low aspect channel 24. Solid distribution pipes with a manifold may be used with or without dosing pipes 22 to get relatively even water delivery to the channel 24. Typically dosing will be carried out with a pump and thus the pipe 22 need only be of small diameter, as previously indicated. Dosing may also be accomplished with a dosing siphon or an accumulator tank with an actuated valve. In another embodiment, dosing pipe 22 may be sandwiched between two channels 24, an upper channel and a lower channel. In another embodiment, when a dosing pipe is sandwiched between two layers, the top geonet layer may have an impermeable sheeting over it to serve to dissipate the water velocity. In still another embodiment, the pipe 22 may be located between 2 approximately horizontally parallel low aspect channels 24.

Figure 6:
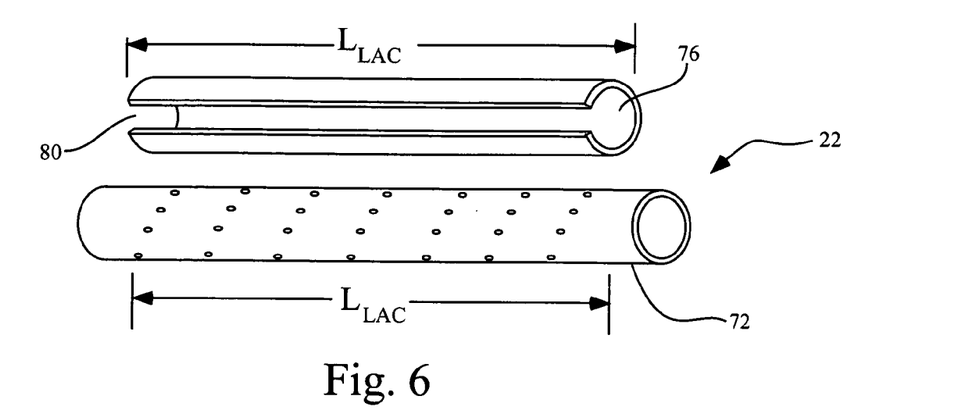
FIG. 6 is an exploded view of one embodiment of a dosing pipe.
Figure 7:
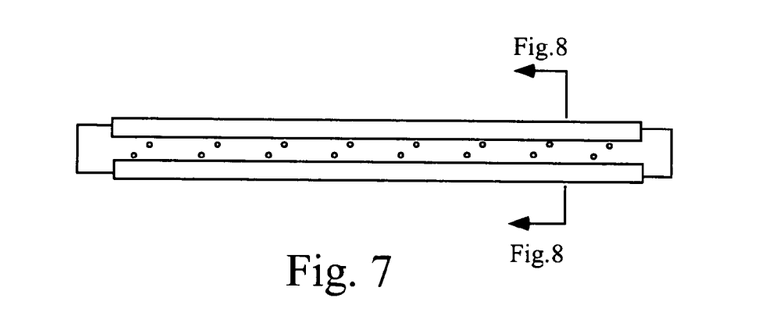
FIG. 7 is a side view of the dosing pipe of FIG. 6.
Figure 8:
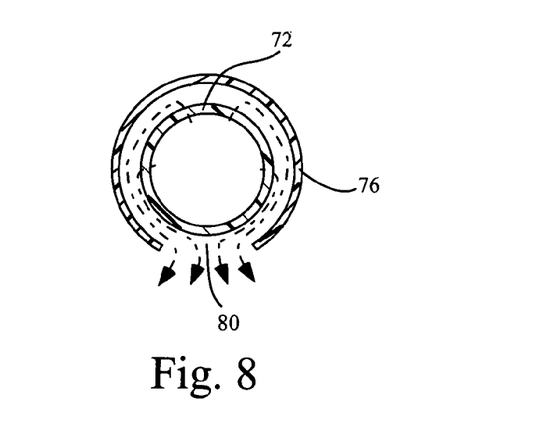
FIG. 8 is a cross-sectional view of the dosing pipe of FIG. 7.

FIG. 6 shows another embodiment of the perforated dosing pipe 22. In this embodiment, the dosing pipe comprises a perforated tube 72, and a slotted sleeve 76. The perforations of the tube 72 lay along a length of the pipe that is approximately equal to the length of the low aspect channel 24, that length is referred to as LLAC. The sleeve length is also approximately equal to the length of the low aspect channel 24. In another embodiment, the slotted sleeve 76 may be relatively short segments located adjacent to a perforation on the tube 72. For instance, if there is one perforation about every 15 feet of tube 72, there may be a sleeve 76 of about 6 inches located adjacent to every perforation. FIG. 7 shows the sleeve 76 fitted over the tube 72. FIG. 8 shows a cross-sectional view through the tube 72 and sleeve 76 through plane A-A. The dotted arrows show possible paths for the water leaving the perforations, and traveling between the sleeve and the tube and exiting the pipe 22 at the slotted area 80. This configuration of a perforated dosing pipe 22 is advantageous in that water will not spray out of the perforations and immediately impact the soil surrounding the conduit 20. This prevents erosion of the soil around the conduit 20. Thus, in this configuration, the dosing pipe 22, allows water to be directed only towards the low aspect channel 24, rather than to the surrounding soil. In this embodiment, a geotextile shroud 26 may be omitted, and a filler medium such as, but not limited to stone, pebble may be used to prevent soil from entering the geonet.

While dosing with a pump is preferred for uniformity of distribution, the pipe 22 may be configured to rely on gravity to distribute the wastewater. In such case a larger pipe, up to about 4 inches in diameter, may be used. In still another embodiment, for either a gravity or a pump system, the pipe 22 may be eliminated, and water may be delivered directly into one end of the channel 24, or into the middle of the channel 24.

Figure 9:
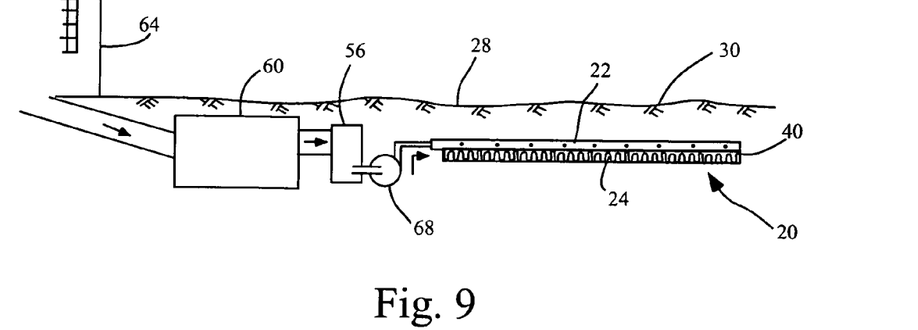
FIG. 9 is a schematic of a disclosed low aspect ratio wastewater treatment system.

The disclosed conduit 20 will provide less interior storage volume, or buffering void space, than prevalent prior art chambers or prior art stone filled trenches. Therefore, depending on the particular flow handling requirements, a water handling system may be used. For example, as illustrated by FIG. 9, a flow equalization tank 56 receives discharge from a processing vessel 60, such as a septic tank. Sewage flows from a discharge source 64 to the processing vessel 60. The discharge source 64 may be, but is not limited to: a residence or a business. Periodically, a dosing device, such as, but not limited to a pump 68 will flow water from the flow equalization tank 56 to the conduit 20 located in the subsurface leach field. The conduit 20 comprises a dosing pipe 22 and a low aspect channel 24. FIG. 6 shows one embodiment of a wastewater scheme. In other embodiments, the flow equalization tank 56 may be omitted, and the PROCESSING VESSEL 60 may be used for flow equalization. This may be facilitated through the use of a pump to control levels in the primary processing tank.

In use, the conduit 20 will be periodically dosed with wastewater according to the particular soil's hydraulic conductivity, preferably with loading rates of about 0.25 to about 3 inch per unit horizontal bottom surface area. Preferably, the time between dosing will about two times the time for a dose of water to percolate into the soil. It is conceived that that will better enable the low aspect channel 24 and recently-saturated soil near the low aspect channel to drain of water, and to refill with gas, which is in good part oxygen containing air, flowing downward through the soil and through the permeable top of the conduit. If air distribution pipes are connected to vents, the foregoing effect can be enhanced by suitable valving at the inlet end of the pipe or pipes, through the use of check valves on the vent lines, which valves will close when water is applied to the conduit. When the water percolates into the soil, it allows the check valve or similar functioning device to open and provide for the flow of air to replace an equal volume of water.

When using a low aspect channel 24 as described in this patent application, the vertical dimension (h) may be about one inch. A one-inch high low aspect channel will only hold one-inch depth of water. So, the ratio of volume to area is 1 to 1. This low ratio of volume to area arises from the present invention's low aspect ratio and is advantageous in that it prevents anaerobic conditions from developing such that a biomat layer is formed on the bottom surface of the channel 24. Therefore, smaller doses of anaerobic water and organisms enter the influence zone. The influence zone is that zone where waste water is largely renovated, or biochemically converted into a more environmentally benign form, prior to re-introduction into the ground water. This prevention of anaerobic conditions encourages a stable and sustainable aerobic microbial community to be present on a continuing basis thereby providing for greater treatment of the wastewater. This also results in a greater long term acceptance rate of wastewater at a greater percolation rate.

Thus for any given daily flow of water, the flow must be dosed out to the channel in an amount that does not overflow the conduit, that is, the amount of water must be no more than the volume containable by the conduit at any one time. For instance, if the conduit has 4 rows of 20 foot channels, that are each 1 inch high and 10 inches wide, and the conduit is filled either with a geonet or other medium thereby allowing a void space of about 95%, then the total instant capacity for that conduit is given by the following:

20 feet (length)×12 inches/foot×1 inch ($h$)×10 inches ($w$)×4 rows×95%=9120 in$^3$.

Thus, wastewater from the source 64 should be dosed out in increments of no more than about 9120 in$^3$ at a time, to prevent over-flowing of the channel 24. If the conduit appears to be overflowing, despite limiting the increment of water to a proper amount, then this may be an indication that there is a malfunction such as, but not limited to a blockage in the system.

In one embodiment of the disclosed conduit, the height of low aspect channel is about 3 inches or less, and preferably about 1 inch or less. Correspondingly, the ratio of volume to bottom surface area is about 3 to 1 and less, preferably about 1 to 1 and less.

Figure 10:
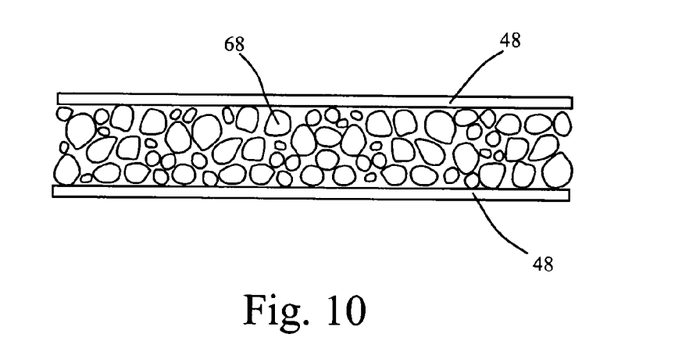
FIG. 10 is a cross-sectional view of a disclosed alternative to a geonet.

Other plastic products which function similarly to a geonet may be used, so long as there is a substantial void between top and bottom layers. For example, a molded plastic three dimensional grid may be used. FIG. 10 shows another alternative. The geonet may be replaced by granular media 68, such as crushed stone or pea stone, captured between two layers of air permeable sheeting 48, such as a geotextile. In another alternative, polystyrene aggregate incorporated into suitable netting or blanket may be used. For example, the type of polystyrene aggregate associated with the commercial product EZflow Drainage Systems may be used. EZflow drainage systems are manufactured by RING Industrial Group, LP, 65 Industrial Park, Oakland, Tenn. 38060. When soil conditions are favorable, and there is not a great risk of upwardly moving fine grained material from the underlying soil, it might be acceptable to eliminate the bottom geotextile layer in any embodiment of the invention.

Figure 11:
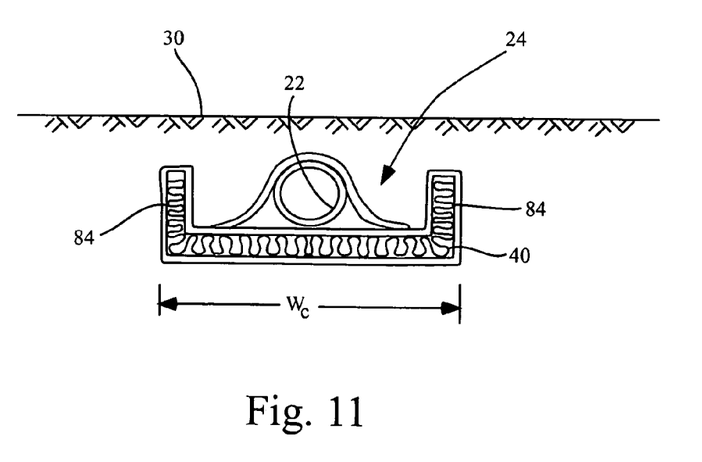
FIG. 11 is another embodiment of the disclosed leaching conduit.

FIG. 11 shows another embodiment of the disclosed conduit. In this embodiment, the low aspect channel 24 has a width $w_c$. However, the geonet 40 has a width that is greater than $w_c$, such that when the geonet 40 is placed in the channel 24, two sides 84 of the geonet 40 bend up or down along the sides of the channel 24. After the channel 24 is dug, and the geonet 40 is placed in the channel, then a perforated dosing pipe 22 may be located on top of the geonet 40, with a geotextile shroud 26 over the pipe 22. Then, soil is filled in to the soil surface 30. In this embodiment, the channel 24 is no longer mostly rectangular shaped in cross-section, but is approximately "U" shaped in cross-section.

Figure 12:
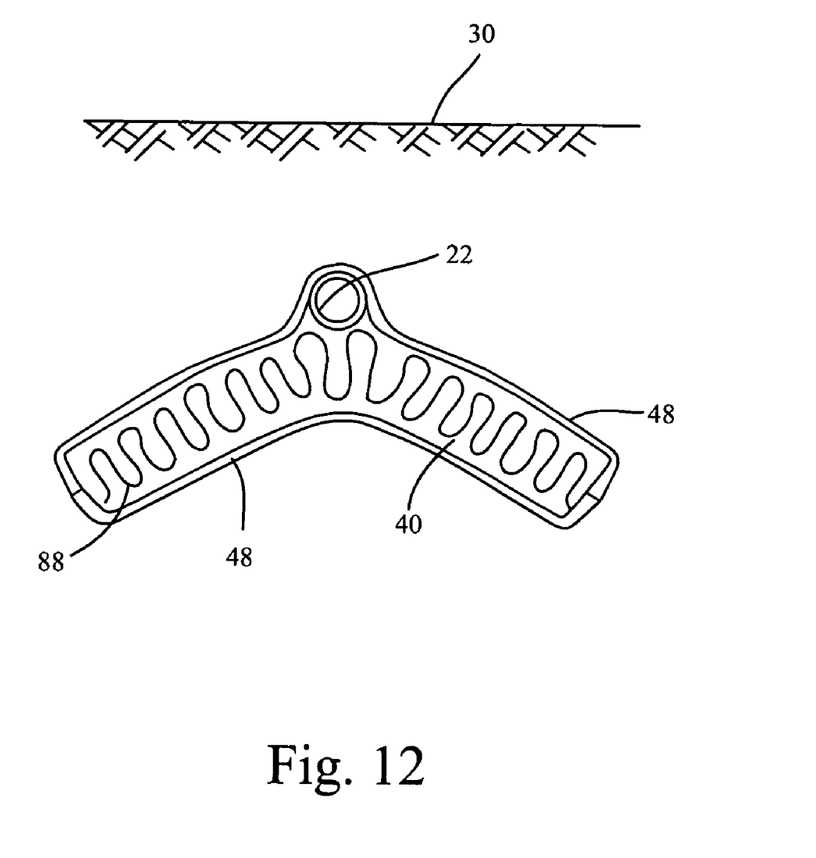
FIG. 12 is another embodiment of the disclosed leaching conduit.

FIG. 12 shows another embodiment of the disclosed conduit. In this embodiment, the low aspect channel 88 may be curved as shown. An air permeable sheeting 48, such as a geotextile material, may be located on the boundaries of the channel 88 and around the dosing pipe 22. The conduit may have a geonet located within it.

While it is an advantage to be able to put the conduit of the invention near the surface 30 and atmospheric oxygen, in some climates freezing of the soil and water in the conduit could be a risk. There is the obvious choice to install the system deeper. Another choice, which also may involve compromise with respect to vertical gas interchange, is to place an insulation layer within the soil, above the conduit. For instance, a cellular plastic insulation board can be installed. The board may inhibit the desired vertical gas interchange, so it may be provided selectively with through holes, to enable soil gas flow. More preferably, the insulation will be air permeable media which nonetheless provides better insulation that soil. For instance, pellets of plastic or perlite may be provided, as well as polystyrene aggregate, mentioned above. If the conduit is comprised of closed cell aggregate, and not a geonet, then the aggregate itself will provide the conduit with self-insulation, which will inhibit the cooling and freezing, at least in the bottom portion. A blower can also be utilized to provide for increased drainage during subfreezing conditions.

A geogrid is typically a product that is used to stabilize soil to vehicle loads, etc and is typically a square mesh that gets buried above the strata requiring stabilization. The disclosed low aspect ratio conduit may have a geogrid installed between the conduit and the soil surface to protect the conduit from wheel loads.

The disclosed leaching system is more likely to have aerobic conditions due to its low aspect ratio and its low maximum volume to bottom surface ratio of the conduit, thus leading to better processing of the wastewater. The disclosed system also provides for wastewater processing near the soil surface, which provides for greater access to oxygen and a greater likelihood of aerobic conditions for the processing. Furthermore, as septic fill becomes increasingly scarce and more expensive, the low aspect ratio leaching conduit minimizes the need and quantity of fill required. Additionally, air may be flowed through the conduit to optimize aerobic conditions.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A leaching conduit located below the surface of the ground, the leaching conduit comprising:
    an elongated channel with a top surface, a bottom surface and with a height and width, wherein the aspect ratio of the channel is given by the height divided by the width, wherein the channel comprises a volume for receiving wastewater, and wherein the top surface and the bottom surface are permeable to air,
    wherein a mat is positioned within the channel, the mat having a thickness;
    a dosing pipe overlying the top surface of the elongated channel, along at least a partial length of the elongated channel,
    effluent from the dosing pipe in fluid communication with the mat in the channel; and
    wherein the aspect ratio of the channel is configured to promote aerobic conditions in and around the leaching conduit, the aspect ratio of the channel is less than about 0.2.

2. The leaching conduit of claim 1 further comprising an air blower in fluid communication with the channel, wherein the air blower is configured to intermittently provide oxygen and at least one other different gas to the conduit and assist in dissipating water into the soil.

3. The leaching conduit of claim 1, further comprising:
    a geotextile sheeting, permeable to air and water, surrounding at least a portion of the dosing pipe along at least a portion of the length of the dosing pipe.

4. The leaching conduit of claim 1 wherein the mat comprises a synthetic air permeable system.

5. The leaching conduit of claim 4, wherein a cross-section of the elongated channel forms a shape of a "u" or has sides that are turned up or turned down along the length of the elongated channel.

6. The leaching conduit of claim 1, wherein the mat is a geotextile comprising irregularly positioned strings.

7. The leaching conduit of claim 4, wherein the mat has a thickness of about one inch or less and has an upper surface in fluid communication with a material of air permeable sheeting.

8. The leaching conduit of claim 7, wherein the material is a geotextile.

9. The leaching conduit of claim 1, wherein the mat is a geonet selected from the group consisting of:
    a core of fused, entangled filaments and a geotextile fabric bonded to one side,
    thin-walled independent plastic rings connected by an interlocking geogrid structure,
    a porous geotextile fabric, molded directly to the one inch high integrated ring and grid system;

a system of rigid upstanding rings connected with a flexible diagonal geogrid injection molded onto a geotextile fabric;

an injection molded consisting of very strong rings integrated with a grid on one side;

a flexible, injection-molded plastic ring-and-grid mat system with a filter fabric backing;

a structure of thin-walled cylindrical columns injection molded of recycled resins of either high impact polypropylene (HIPP); or high density polyethylene (HDPE), a perforated panel-shaped plastic core wrapped with a soil filtering geotextile, polystyrene aggregate.

10. The leaching conduit of claim 1, wherein the aspect ratio of the channel is less than about 1/10.

11. The leaching conduit of claim 1, wherein the aspect ratio of the channel is less than about 1/30 to about 1/36.

12. The leaching conduit of claim 1, wherein the dosing pipe comprises:

a perforated tube;

a slotted sleeve located about the perforated tube along at least a portion of the perforated tube, with the slot facing the channel, wherein the dosing pipe overlies and is in fluid communication with a majority of the elongated channel.

13. The leaching conduit of claim 1, wherein the channel further comprises a granular media.

14. The leaching conduit of claim 1, wherein the height of the channel is less than about 1 inch.

15. The leaching conduit of claim 1, further comprising:

a shroud above the leaching conduit.

16. The leaching conduit of claim 1 wherein the bottom surface of the elongated channel is in fluid communication with effluent from the dosing pipe.

17. The leaching conduit of claim 1 wherein the top surface and the bottom surface of the elongated channel are permeable to air and water.

18. The wastewater system of claim 1 wherein the mat is synthetic and wherein the synthetic comprises intertwined strings.

19. A wastewater system comprising:

an elongated leaching conduit located below the surface of the ground wherein the leaching conduit comprises:

a first elongated channel with a height and width, and a top surface and a bottom surface, the top surface and the bottom surface being permeable to air, wherein the aspect ratio of the channel is given by the height divided by the width and wherein the height of the channel is defined by a mat in the channel, along the length of the channel;

a dosing pipe overlying the channel wherein effluent from the dosing pipe is in fluid communication with the channel; and wherein the aspect ratio of the channel is configured to promote aerobic conditions in and around the leaching conduit, the aspect ratio of the channel is less than about 0.2.

20. The wastewater system of claim 19, wherein the dosing pipe overlies the majority of the elongated channel.

21. The wastewater system of claim 19, wherein the dosing pipe is located between two channels with an aspect ratio of less than about 0.2.

22. The wastewater system of claim 19, further comprising:

a flow equalization tank in fluid communication with the processing tank and the leaching conduit.

23. The wastewater system of claim 22, further comprising:

a pump with an inlet and an outlet, and wherein the inlet is in fluid communication with the flow equalization tank and the outlet is in fluid communication with the leaching conduit.

24. The wastewater system of claim 19, wherein the leaching conduit further comprises:

a geotextile shroud draped over the dosing pipe and running downwardly and laterally outward onto the top surface of the channel.

25. The wastewater system of claim 19, wherein the mat is a geonet located within the channel.

26. The wastewater system of claim 25, wherein the geonet is selected from the group consisting of:

a nylon core of fused, entangled filaments and a geotextile fabric bonded to one side;

thin-walled independent plastic rings connected by an interlocking geogrid structure;

a porous geotextile fabric, molded directly to the one inch high integrated ring and grid system;

a system of rigid upstanding rings connected with a flexible diagonal geogrid injection molded onto a geotextile fabric;

an injection molded consisting of very strong rings integrated with a grid on one side;

a flexible, injection-molded plastic ring-and-grid mat system with a filter fabric backing;

a structure of thin-walled cylindrical columns injection molded of recycled resins of either high impact polypropylene (HIPP); or high density polyethylene (HDPE), a perforated panel-shaped plastic core wrapped with a soil filtering geotextile, polystyrene aggregate.

27. The wastewater system of claim 19, wherein the aspect ratio of the channel is less than about 1/10.

28. The wastewater system of claim 19, wherein the aspect ratio of the channel is less than about 1/30 to about 1/36.

29. The wastewater system of claim 19, wherein the dosing pipe comprises:

a perforated tube;

a slotted sleeve located over the perforated tube, with the slot facing the channel.

30. The wastewater system of claim 19, wherein the channel also contains a granular media.

31. The wastewater system of claim 19, further comprising an air blower in fluid communication with the conduit, wherein the air blower is configured to intermittently provide oxygen to the conduit and assist in dissipating water into the soil.

32. The wastewater system of claim 19, wherein the height of the channel is less than about 1 inch.

33. A leaching conduit located below the surface of the ground, the leaching conduit comprising:

an elongated channel with a top surface and a bottom surface, and with a height and width, wherein the aspect ratio of the channel is given by the height divided by the width, the channel having a cross-section alone the length of the channel, the channel containing a molded grid between the top surface and the bottom surface;

a dosing pipe in fluid communication with the channel, the dosing pipe overlying the channel along the length of the channel; and wherein the aspect ratio of the channel is configured to promote aerobic conditions in and around the leaching conduit, and the aspect ratio of the channel is less than about 0.2.

34. A wastewater system leaching conduit comprising:
air permeable sheeting bordering at least two surfaces of an elongated channel,
wherein the elongated channel has a height and width, and a top surface and a bottom surface,
wherein the aspect ratio of the elongated channel is given by the height divided by the width,
wherein the aspect ratio of the elongated channel is configured to promote aerobic conditions in and around the leaching conduit, the aspect ratio of the channel is less than about 0.2, and
a mat positioned adjacent the at least two surfaces of the air permeable sheeting and within the elongated channel.

35. The wastewater system of claim 34 further comprising:
a dosing pipe in fluid communication with the mat along a length of the elongated channel.

36. The wastewater system of claim 34 wherein the sheeting surrounds the mat.

37. The wastewater system of claim 34 wherein the mat has a thickness of about less than one inch.

* * * * *